Nov. 8, 1949　　　W. G. CARTTER　　　2,487,776
FUEL BURNING SPACE HEATER

Filed June 4, 1946　　　　　　　　6 Sheets-Sheet 1

INVENTOR.
WILLIAM G. CARTTER.
BY
ATTORNEYS.

Nov. 8, 1949

W. G. CARTTER 2,487,776

FUEL BURNING SPACE HEATER

Filed June 4, 1946

INVENTOR.
WILLIAM G. CARTTER.
BY

*Huebner, Maltby & Buehler*

ATTORNEYS.

Nov. 8, 1949 W. G. CARTTER 2,487,776
FUEL BURNING SPACE HEATER
Filed June 4, 1946 6 Sheets-Sheet 4

INVENTOR.
WILLIAM G. CARTTER.
BY
ATTORNEYS.

Nov. 8, 1949

W. G. CARTTER

2,487,776

FUEL BURNING SPACE HEATER

Filed June 4, 1946

INVENTOR.
WILLIAM G. CARTTER.
BY
ATTORNEYS.

Nov. 8, 1949 W. G. CARTTER 2,487,776
FUEL BURNING SPACE HEATER

Filed June 4, 1946 6 Sheets-Sheet 6

INVENTOR.
WILLIAM G. CARTTER.
BY
ATTORNEYS.

Patented Nov. 8, 1949

2,487,776

UNITED STATES PATENT OFFICE 2,487,776

FUEL BURNING SPACE HEATER

William G. Cartter, Monrovia, Calif.

Application June 4, 1946, Serial No. 674,171

12 Claims. (Cl. 126—91)

The invention relates to space heaters and particularly to heaters which are so designed that they can be installed in the wall of a room. The heater comprising the subject matter of this invention to adapted to be gas fired.

The present application deals with improvements over the subject matter of my copending application, Serial No. 549,542, filed August 15, 1944, and is in part a continuation thereof.

In certain sections of the country a type of heating which has been found very advantageous is of a nature often designated as flash heating. The idea is primarily to provide a heat source which can be placed in operation very quickly, which is capable of immediately supplying a large quantity of heat to bring a room up to temperature and can then be readily readjusted so that it throws off only a very moderate amount of heat sufficient to keep the room at temperature. These heaters are of a design such that when the heat is no longer desired they can be shut off and permitted to cool off very rapidly.

Although a great many attempts have been made in the past to provide heaters for the so-called flash heating purpose, a great many of these heaters have been relatively expensive to install. The so-called floor furnace, for example, although equipped to utilize gas as a heating agent and provide quick heating by heat distributed through convection currents, has necessitated the preparation of a pit below floor level for the installation of a part of the device. Use of a pit has made access to such devices difficult both for lighting the gas whenever heat is desired and for renovating the burners and other portions of the device when necessary. Moreover, floor furnaces are not ordinarily installable in second story floors or higher.

In the case of some wall heaters heretofore used difficulty has been experienced in providing access to the pilot light and to the burners without marring the appearance of the installation. Because of the fact that a considerable amount of heat is generated in the combustion space, resort has been had to rather cumbersome and expensive installations in order to make the devices perfectly safe.

It is, therefore, among the objects of this invention to provide a new and improved body height heater for installation in the wall of a room whereby heat will radiate and be reflected into the room throughout a strata where heat is most required and with sufficient volume and direction so that the space will be adequately heated in a relatively minimum amount of time.

Another object of the invention is to provide a new and improved heater which can be quickly and economically installed in the partition wall of a room so that a heater is provided on either one side or both sides and which when installed is made safe without the necessity of providing an excessive amount of insulation.

Still another object is to provide such a heater of improved design so that portions of it can be efficiently and readily removed to give access to the interior and then replaced, whenever occasion might require.

A further object is to provide a new and improved heater which is gas fired and vented and which has incorporated in its design features which greatly promote the efficiency of the combustion of the gas and likewise provides a vent of such design that practically no products of combustion can find their way into the heated space. The term "gas" obviously includes liquid fuels which are convertible into combustible gas in use.

Still further among the objects of the invention is to provide in a heater suitable elements forming a combustion space, reflector space and vent space which are so located that air at atmospheric temperature is drawn past certain of the elements and finally, with a mixture of products of combustion, is passed through a suitably insulated vent, thereby providing a path of travel which permits the air at atmospheric temperature to provide a cooling effect around hot portions of the device.

It is also an object of the invention to provide a space heater, all parts of which are located above the floor level for ease in cleaning and also for the purpose of placing the heat source in a most advantageous location within the wall, the heater being so designed that air for combustion purposes may be drawn from a space within the wall as well as from the strata of air adjacent the floor of a space to be heated, the heater being provided with a source of heat of large area so that there is no excessively hot spot.

With these and other objects in view, the invention consists in the construction, arrangement and combination of the various parts of the device whereby the objects contemplated are attained, as hereinafter more fully set forth, pointed out in the claims and illustrated in the accompanying drawings, in which:

The heater embodying the invention is shown in one of its forms in the attached drawings. For the purpose of illustration a double heater has been selected, namely, one which can be installed in a partition wall so that it is adapted to heat the space on both sides of the partition. It is, of course, possible to utilize the principal features of the invention in a single type heater which will heat the space on one side only of the wall.

Figure 1:
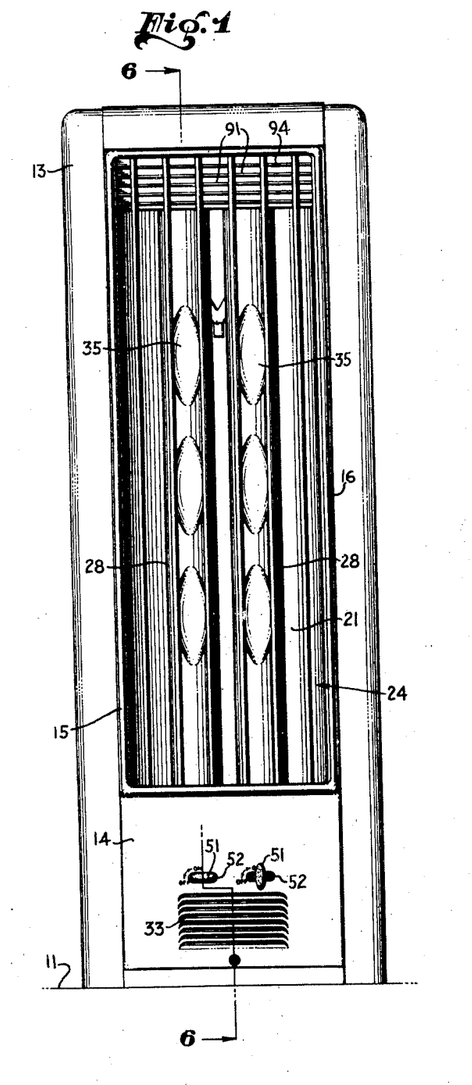
Figure 1 is a front elevational view of a heater illustrating by improvements.
Figure 2:
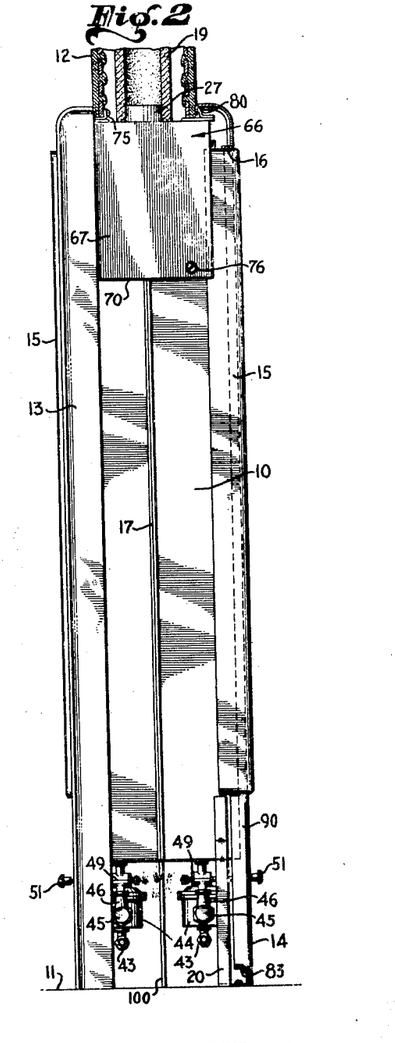
Figure 2 is a side elevational view of the heater showing a small section of the wall in which it may be installed.
Figures 8, 10:
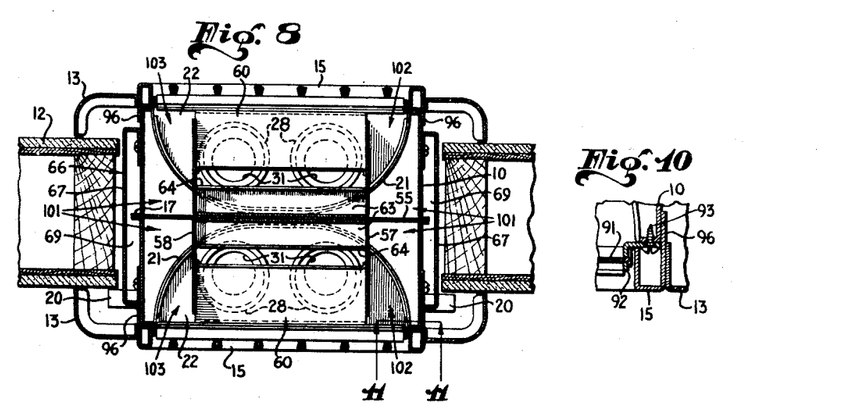
Figure 8 is a cross-sectional view taken on the line 8—8 of Figure 6.
Figure 10 is a fragmentary, cross-sectional view showing a joint at the edge of the reflector.
Figure 9:
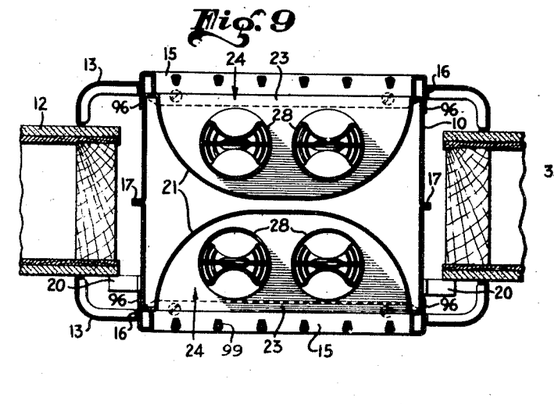
Figure 9 is a cross-sectional view taken on the line 9—9 of Figure 6.

In the drawings the space heater chosen for the purpose of illustration is embodied in a rough-in box 10, one side of which is visible in Figure 2, the cross-sectional shape of which can be best seen in Figures 8 and 9. The rough-in box in most models may extend to a height of four to five feet above a floor surface 11 and is designed to be installed in a suitable opening cut in a partition or other building wall 12. After the rough-in box, in company with all of the other necessary parts of the heater, has been installed, the installation may be "dressed up" by the application of trim comprising a molding frame 13, a front panel 14 at the bottom of the frame and a grill 15 which fits in an opening 16 within the frame and above the panel 14. The appearance of the heater when completely installed in a wall is best seen in Figure 1.

The rough-in box 10, in the particular embodiment chosen, consists of two halves welded or otherwise secured together along vertical joints 17 which are visible particularly in Figures 8 and 9. It is necessary, however, to describe only one-half of the double unit heater since each half is identical, as shown in the drawings. However, the number of heating tubes on each side may vary according to the area intended to be heated.

Normally, the rough-in box is supported upon legs 20 which need be of only lightweight construction inasmuch as a considerable portion of the weight of the device is supported by the partition wall once it is in place. In the embodiment shown, the material comprising a wall of the rough-in box is extended into the form of a vertically elongated concave reflector 21. At the top of the reflector is a horizontal shelf or partition 22, while near the bottom is a second shelf or partition 23, the partitions serving to establish a reflecting chamber or heating space designated by the character 24. The partitions may be joined to the reflector by an arrangement of the type suggested in Figure 11 wherein a lip 52 extends through a suitable aperture in the reflector 21.

The partition 23 forms a bottom for the reflector (heating) space as well as a top for a combined burner and combustion space or chamber 25. Above the partition 22 is a superstructure 26a which forms a collection box or flue chamber 26 which has communication with a vent 27 at the top of the panel heater. A flue 18 leads upward from the vent 27 to carry off the products of combustion.

Extending between the partitions 22 and 23 is a pair of heating tubes 28, each tube having a passage 29 therethrough having an inlet 30 opening into it from the burner space or chamber 25 and an outlet 31 opening into the flue chamber. Below the burner chamber is still another space 32 which is in communication with the air of the room to be heated through a set of louvers 33. Part of the air which is used for combustion purposes passes through the louvers 33 to the space 32, thence upwardly to the chamber 25 through the heating tubes 28 to the flue chamber and finally outwardly through the vent 27.

The heating tubes are of special design and described in greater detail in my co-pending patent application, Serial No. 549,542, filed August 15, 1944, and in my U. S. Patent No. 1,991,788 granted February 19, 1935. Briefly, each consists of a tube having a longitudinal partition 34 and spaced indentations 35 on opposite faces of the tube which at the deepest point 36 thereof are pressed against pimples on the partition 34. By virtue of the interposition of the partition and the indentations, products of combustion undergo a tortuous passage upwardly through the heating tubes. It may also be said that the partition 34 is free from contact with the tube at its edges and need not necessarily extend all the way to the bottom of the tube. By reason of this construction the partition 34 may be readily slid tightly into place in the tube.

Figures 11, 12:
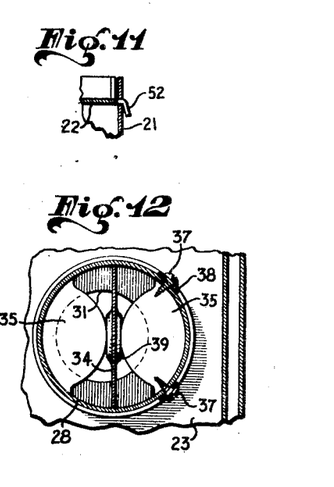
Figure 11 is a fragmentary, longitudinal, sectional view taken on line 11—11 of Figure 8.
Figure 12 is a fragmentary, cross-sectional view of one of the heating tubes showing a means of attaching it to supporting structure, taken on line 12—12 of Figure 6.
Figure 13:
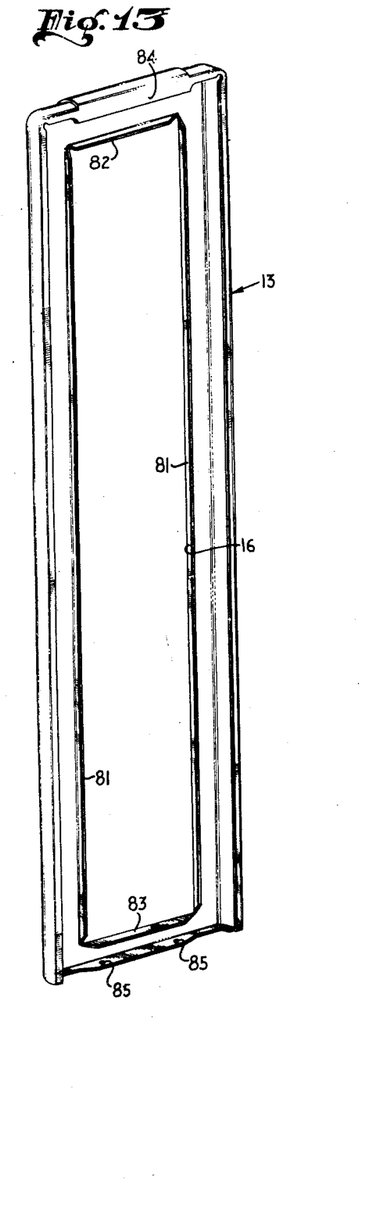
Figure 13 is a rear perspective view of the molding trim.

The tubes may be held in place by screws 37 which extend through flanges 38 on the partition 23. Figure 12 illustrates a detail of the attachment.

At the bottom of the burner space there is positioned a bracket 40 which may be suspended, if desired, from the partition 23. Upon the bracket are mounted a pair of identical burners 41, the tops 42 of which are approximately the same in diameter as the inside diameter of the heating tubes and are positioned adjacent to but spaced from the bottom edge of the tube in each case.

For supplying the burners with gas for combustion purposes a supply line 43 connects with a control 44 of conventional design from which a feed pipe 45 extends in a lateral direction and is adapted to be connected to the burners by short lengths 46 of pipe. A pilot 47 is located between the two burners and is connected through a valve 48 to the feed pipe 45. Each of the burners is provided with a shut-off valve 49 from which extends a stem 50 provided with a handle 51 located in front of the panel 14. The burners may be equipped for thermostat control, if desired.

Figure 6:
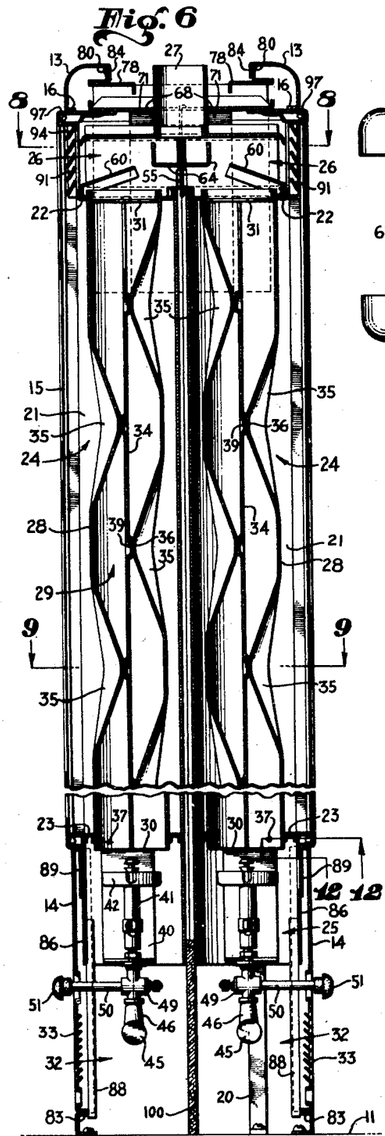
Figure 6 is a vertical, sectional view taken on the line 6—6 of Figure 1.
Figure 16:
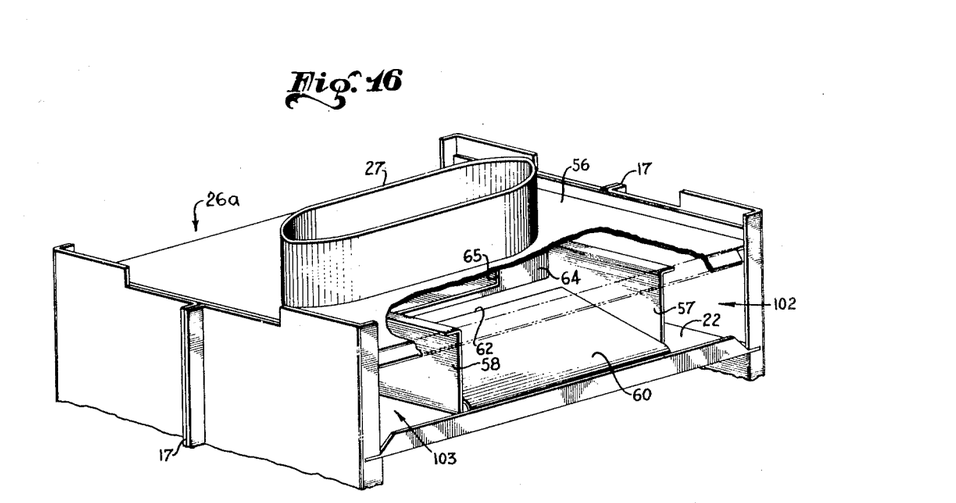
Figure 16 is a perspective view of the top of the heater partly broken away to show further details of the flue box.

The flue chamber or collecting box 26 at the top of the heater is of particular design and comprises the partition 22 which forms the bottom wall thereof, a plate 55 forming the rear wall, a plate 56 forming the top, and plates 57 and 58 forming the side walls, as best seen in Figures 6 and 16. It will be apparent that the flue chamber is narrower in width than the rough-in box or the reflector.

At the bottom of the flue chamber is a deflector or hood 60 which is attached at its front edge 61 to the front edge of the partition 22 and extends upwardly at an oblique angle over the tops of both of the heating tubes. A rear or inner edge 62 of the hood or deflector is located substantially mid-way between the front and back edges of the outlet 31 of each of the heating tubes and is more or less mid-way between the top and bottom of the flue chamber.

Figure 7:
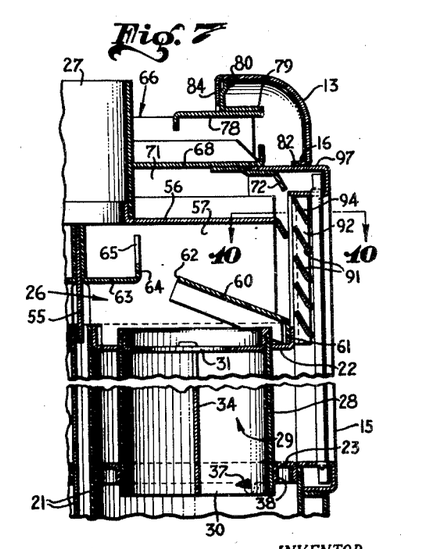
Figure 7 is a broken sectional view drawn to a larger scale showing the flue box in detail and also the top of a heating tube.

Located, also, within the flue chamber is a shelf 63 which forms a baffle for gas during its passage to the vent 27. The baffle extends outwardly from the rear wall 55 of the flue chamber to a location adjacent to but spaced from the rear edge 62 of the hood 60, these details being shown in particular detail in Figures 6 and 7. The front edge of the baffle is preferably turned upwardly to form a flange 64 which has a deep recess 65 extending downwardly from the top. The edge defining the bottom of the recess 65 is slightly higher than the inner edge 62 of the hood.

Above the top of the flue chamber and being part of the superstructure 26a is a sheet metal assembly 66 comprising side panels 67 roughly C-shaped in horizontal cross-section. These are provided with a transverse top plate 68 set down a short distance below the very top edges of the side panels 67. The side panels form a channel or space 69 which communicates at the bottom 70 thereof with the space within the partition wall of the building and a space 71 immediately above the top of the flue chamber. Any air drawn inwardly through the channels 69 and space 71 is free to pass outwardly at the front where it may be deflected downwardly by a deflecting edge of a strip 72 so that it is free to find its way into the flue chamber or into the room, depending upon operating conditions.

The assembly 66 may be secured to the rough-in box by use of screws or bolts extending through holes 76 and 77 of the side panels 67.

Figure 3:
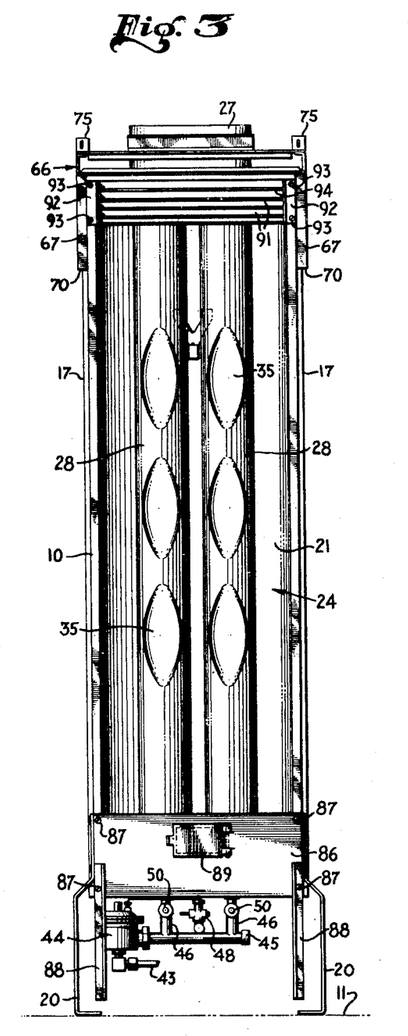
Figure 3 is a front elevational view of the heater with trim and grill removed.
Figure 4:
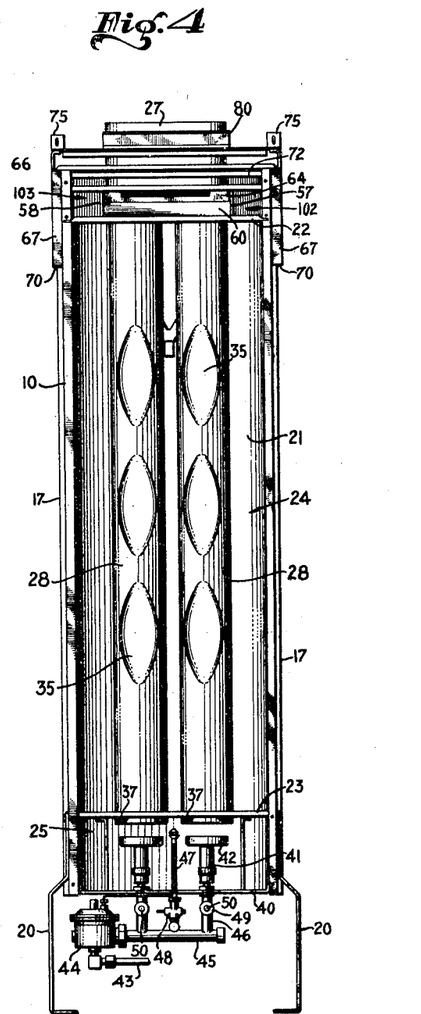
Figure 4 is a front elevational view of the heater similar to Figure 3 but with louvers and a front plate of the burner chamber removed to show the location of the burners.
Figure 5:
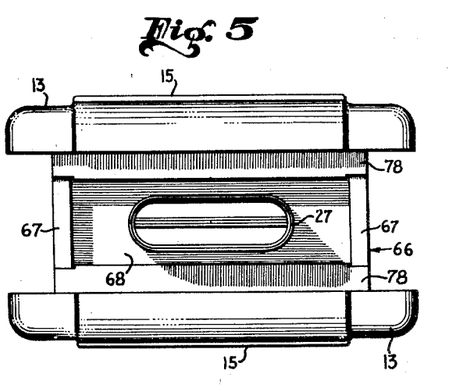
Figure 5 is a top view of the heater shown in Figures 1 and 2.
Figure 15:
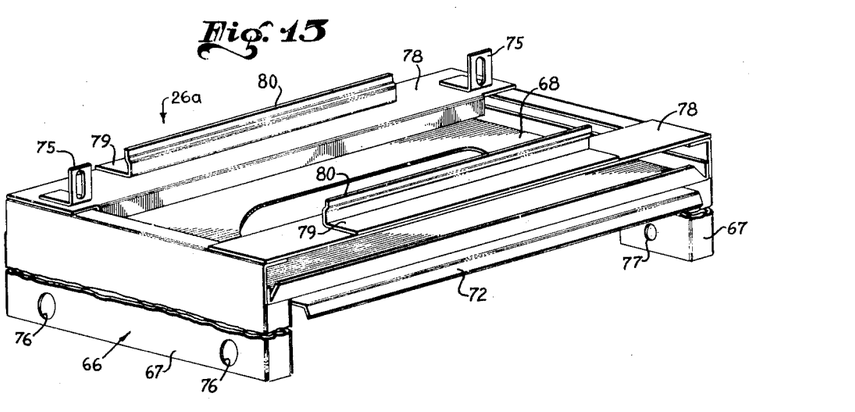
Figure 15 is a perspective view of certain top elements of the heater showing a means of attaching the trim and grill.

The heater without the trim and grill may be lifted into place in the partition wall and partly suspended therein by use of brackets 75 at the top of the assembly 66, these brackets being shown particularly in Figures 3, 4 and 15. The legs 20 may be screwed to the floor to provide a bottom support. These connections make a substantially permanent installation of the heater in the wall with the exception of cover and trim.

In order to neatly finish off the installation, the trim 13 is then applied. To make application of the trim an inexpensive and efficient operation, there is provided at the top of the assembly 66 a cross-brace 78, at the mid-portion of which is secured a bracket 79 providing an inner upstanding lip 80. The trim previously identified, which is in the form of a molding frame, has vertical bent portions 81 at the sides and horizontal bent portions 82 and 83 at the top and bottom, respectively, of the opening 16. A certain amount of resiliency is built into the bent portions so that they fit neatly around the sides and top of the rough-in box. At the top of the inside surface of the trim there is provided a downwardly depending lip 84 which is adapted to engage over the lip 80 of the bracket 79. By this device the trim is suspended and at the same time pressed snugly into position, particularly at the top. Once hung the bottom of the trim may be pressed into place and firmly secured by screws extending downwardly through screw holes 85.

For closing the front of the burner chamber there is provided a plate 86 which is attached by screws 87 to the front edge of the rough-in box and to the partition 23. The plate is provided, furthermore, with downwardly extending strips 88 which are cut off short of the floor surface 11. At the mid-portion of the plate 86 is an outwardly swinging door 89 which can be opened to give direct access to the pilot 47.

Normally, however, the plate 86 and likewise the door 89 will be covered by the panel 14, the edges 90 of which have a friction fit against the outside surfaces of the rough-in box. The panel 14 is prevented from being pushed inwardly beneath the plane of the trim by virtue of the interposition of the strips 88.

At the top of the panel heater immediately in front of the flue chamber there is provided a set of louvers 91 supported upon strips 92, the strips in turn being attached to the front edges of the rough-in box by means of suitable screws 93. It should be noted that there is provided, in particular, an upper louver 94 which lies in front of the space 71; whereas, the remaining louvers lie immediately in front of the flue chamber.

Figure 14:
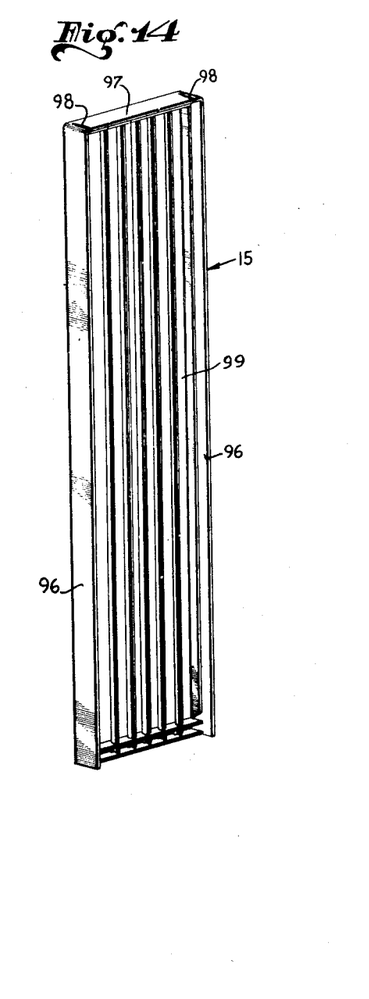
Figure 14 is a rear perspective view of the grill.

In order to protect persons against contact with the combustion tubes which become extremely hot, there is provided the grill 15, illustrated in Figure 14, which comprises an outer frame 96 having vertical side edges and a top edge 97 separated along the lines 98 so as to provide the edges with a spring-like resiliency in order that they may grip frictionally around outer surfaces of the rough-in box and inside of the molding frame. The top edge 97, in particular, is adapted to slip into a narrow space between the transverse top plate 68 and the upper face of the strip 72. By these means the grill is snugly retained in place by the friction fit of its frame and can be readily removed from engagement with the rough-in box by merely pulling it outwardly.

The vertical bars 99 of the grill are preferably of substantially triangular cross section with an apex pointing inwardly, whereby heat from the combustion tubes strikes the angled walls and the bars by reflecting the heat diagonally retain a minimum of heat and offer a greater degree of safety, in event of human contact with the grill. The cross section may be seen in Figures 8 and 9.

Where it may be desired to isolate the heated space on one side of the building partition from the other to prevent, for example, the passage of sound, there may be provided a wall 100 extending downwardly mid-way between the rearmost portions of the reflectors, thus dividing the space 32 in which the valves are positioned into two separate spaces.

After the device has been installed and the pilot is ready for lighting, it is first necessary to remove the panel 14, open the door 89, turn on the pilot valve and light the gas. The panel 14 is then replaced, the handles 51 being adapted to pass through appropriate apertures 52 in the panel so long as the handles are rotated to off position. If it is intended to use both burners, both of the valves 49 are turned on by rotating the handles 51. The heater may be used with only one burner operating, if preferred, by merely shutting off the other burner.

During combustion air enters the burner chamber partly through the louvers 33 and partly from the space within the partition wall which communicates with the burner chamber behind the panel 14. The products of combustion formed at the burners pass upwardly through the heating tubes which they heat to the desired temperature and thence continue upwardly into the flue chamber. Upon passing into the flue chamber, the products of combustion are deflected rearwardly by the hood 60, are next deflected somewhat forwardly by the baffle 63, then passed rearwardly again through the recess 65 and finally up the flue 27. By reason of passage upwardly of hot products of combustion a draft is set up in the flue chamber which may under same operating conditions tend to draw some air inwardly between the louvers 91. These louvers and the opening adjacent thereto provide relief for a downdraft condition.

Air also is fed from a space 101 surrounding the rear of the reflector forwardly through passages 102 and 103 between the side walls 57 and 58 of the flue chamber and the respective adjacent side walls of the rough-in box. This air passes around the front edges of the side walls 57 and 58 and thence into the flue chamber or into the room.

The drafts thus described feeding from various directions tend to maintain a circulation of air past the hot reflector, thereby imparting a certain cooling effect and improving the draft and circulation around the portions of the heater which might tend to become overheated.

In case a down draft condition occurs, the down draft strikes the baffle 63, and thence is deflected over the hood 60 and out through the louvers 91, thus protecting the flame at the pilot or other burners.

The heating tubes radiate heat outwardly into the room or the heated space with the assistance of the reflectors, and the space thereby becomes heated as a result of radiation assisted by some convection currents. Cold air in the space which is heated settles by gravity to a strata adjacent the floor and is fed into the combustion chamber through the louvers 33.

By the design of the heater thus described the various parts may be easily dismounted whenever access is required to the working elements of the device. These parts, which constitute the trim, the panel 14, the grill 15 and the plate 86, are easily replaced or removed at will. Furthermore, the entire heater may be quickly and readily removed, if desired.

There has accordingly been provided an efficient wall heater which is inexpensive in its construction due to providing parts which cooperate with one another without the necessity of providing more than a few bolted connections and which is so designed that it affords a maximum amount of heating capacity and provides at the same time a maximum amount of safety without the need of any auxiliary insulation.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent structures.

Thus, while the embodiment illustrated is a back to back heater for servicing either one or both of two rooms, and the rough-in box and vertical isolating partitions 100 and 55 are designed accordingly, it is obvious that either unit of the heater is adaptable to use and installation as a single side heater. In such case the back of the rough-in box may be a flat sheet instead of the duplicate box walls and reflector combination which is illustrated.

The invention having been herein described, what is claimed and sought to be secured by Letters Patent is:

1. A space heater comprising a vertically elongated concave reflector forming the vertical confining and reflecting element of a heating chamber, an upper shelf at the upper end portion of the reflector forming the top of the heating chamber, a lower shelf near the lower end of the reflector forming the bottom of the heating chamber, said lower shelf and subjacent section of said reflector forming the back and sides of a burner chamber, a fuel consuming burner in said burner chamber, a super-structure including walls and top overlying said reflector and mounted in operative association therewith and in cooperation with said upper shelf forming a gas collecting means, a hollow heating element in said heating chamber communicating between said burner chamber and said collecting means and adapted to carry products of combustion from said burner to said collecting means and to be heated thereby.

2. A space heater comprising vertically elongated rough-in box elements adapted for installation in a building wall, a vertically elongated concave reflector secured to and disposed within said box elements forming the vertical confining and reflecting element of a heating space, an upper shelf at the top of the reflector forming the top of the heating space, a lower shelf near the bottom of the reflector forming the bottom of the heating space, said lower shelf and an adjacent section of said reflector forming a burner chamber, a fuel consuming burner in said burner chamber, a superstructure mounted at the upper portion of said box elements and in cooperation with said upper shelf forming a flue chamber, and a hollow heating element in said heating space communicating between said burner chamber and said flue chamber and adapted to carry products of combustion from said burner to said flue chamber and to be heated thereby.

3. A space heater comprising rough-in box elements adapted for installation in a building wall, a concave reflector secured to and disposed within said box elements forming the vertical confining and reflecting element of a heating space, an upper apertured shelf at the top of the reflector forming the top of the heating space, a lower apertured shelf near the bottom of the reflector forming the bottom of the heating space, said lower shelf and an adjacent section of said reflector forming a burner chamber, a bracket supported by said reflector in said burner chamber, a fuel consuming burner mounted on said bracket in said burner chamber, a heating tube in said heating space extending from below the lower shelf to above the upper shelf through the apertures in the respective shelves and in alignment with the burner adapted to carry upward products of combustion from said burner and to be heated thereby, a removable plate closing off the front of said burner chamber, but said chamber being open at the bottom for introduction of air.

4. A space heater comprising rough-in box elements adapted for installation in a building wall, a concave reflector secured to and disposed within said box elements forming the vertical confining and reflecting element of a heating space, an upper shelf at the top of the reflector forming the top of the heating space, a lower shelf near the bottom of the reflector forming the bottom of the heating space, said lower shelf and an adjacent section of said reflector forming a burner chamber, a fuel consuming burner in said burner chamber, a superstructure mounted at the upper portion of said box elements in cooperation with said upper shelf forming a flue chamber, a hollow heating element in said heating space adapted to carry products of combustion from said burner to said flue chamber and to be heated thereby, and trim means concealing the box elements but leaving the heating space and heating element exposed comprising a molding frame having a top edge in retaining engagement with the superstructure.

5. A space heater comprising rough-in box elements adapted for installation in a building wall, a concave reflector secured to and disposed within said box elements forming the vertical confining and reflecting element of a heating space, an upper shelf at the top of the reflector forming the top of the heating space, a lower shelf near the bottom of the reflector forming the bottom of the heating space, said lower shelf and an adjacent section of said reflector forming a burner chamber, a plate secured to the rough-in box elements and having an access door therein and closing off the front of said burner chamber, a fuel consuming burner in said burner chamber, a superstructure mounted at the upper portion of said box elements and in cooperation with said upper shelf forming a flue chamber, a hollow heating element in said heating space adapted to carry products of combustion from said burner to said flue chamber and to be heated thereby, and trim means concealing the box elements but leaving the heating space and heating element exposed comprising a molding frame having a top edge in retaining engagement with the superstructure.

6. A space heater comprising rough-in box elements adapted for installation in a building wall, a concave reflector secured to and disposed within said box elements forming the vertical confining and reflecting element of a heating space, an upper shelf at the top of the reflector forming the top of the heating space, a lower shelf near the bottom of the reflector forming the bottom of the heating space, said lower shelf and an adjacent section of said reflector forming a burner chamber, a fuel consuming burner in said burner chamber, a superstructure mounted at the upper portion of said box and in cooperation with said upper shelf forming a flue chamber, a hollow heating element in said heating space adapted to carry products of combustion from said burner to said flue chamber and to be heated thereby, and trim means concealing the box elements but leaving the heating space and heating element exposed comprising a molding frame having a top edge in retaining engagement with the superstructure, and a panel held in removable frictional retention by said frame forwardly of said burner chamber.

7. A space heater comprising rough-in box elements adapted for installation in a building wall, a concave reflector secured to and disposed within said box elements forming the vertical confining and reflecting element of a heating space, an upper shelf at the top of the reflector forming the top of the heating space, a lower shelf near the bottom of the reflector forming the bottom of the heating space, said lower shelf and an adjacent section of said reflector forming a burner chamber, a plate secured to the rough-in box elements and closing off the front of said burner chamber, a fuel consuming burner in said burner chamber, a superstructure mounted at the upper portion of said box and in cooperation with said upper shelf forming a flue chamber, the top of said superstructure including an upwardly extending fin, a hollow heating element in said heating space adapted to carry products of combustion from said burner to said flue chamber and to be heated thereby, and trim means concealing the box elements but leaving the heating space and heating element exposed comprising a molding frame having a top edge in retaining engagement with said fin, and a panel held in removable frictional retention by said frame in front of said plate.

8. A space heater comprising a vertically elongated rough-in box element adapted for installation in a building wall, a vertically elongated concave reflector secured to and disposed within said box element forming the vertical confining and reflecting element of a heating space, the rough-in box element and the reflector having joined vertical marginal edges, an upper shelf at the top of the reflector forming the top of the heating space, a lower shelf near the bottom of the reflector forming the bottom of the heating space, said lower shelf and an adjacent section of said reflector forming a burner chamber, a fuel consuming burner in said burner chamber, a superstructure mounted at the upper portion of said box in cooperation with said upper shelf forming a flue chamber, said superstructure including a horizontal forwardly extending strip member, a hollow heating element in said heating space adapted to carry products of combustion from said burner to said flue chamber and to be heated thereby, trim means concealing the box but leaving the heating space and heating element exposed comprising a molding frame having a top edge in retaining engagement with the superstructure and having vertical and upper and lower horizontal in-turned flanges defining a rectangular opening, the vertical flanges being disposed in proximity to the marginal edges of said rough-in box element, a protective grill having a rectangular frame the sides of which are removably frictionally retained between said vertical in-turned flanges and said vertical marginal edges of the rough-in box element and the top of which frame is removably frictionally retained between said upper horizontal flange and said strip member, and a panel held in removable frictional retention by said frame forward of said burner chamber, the lower end of said grill terminating at the upper edge of said panel.

9. A space heater comprising vertically elongated concave reflectors arranged back to back and having inwardly extending side wall members, the side wall members on each side being secured together, each of said reflectors forming the vertical confining and reflecting element of a heating chamber, an upper shelf at the upper end portion of each reflector forming the top of the heating chamber, a lower shelf near the lower end of each reflector forming the bottom of the heating chamber, each said lower shelf and a subjacent section of each said reflector forming the back and sides of a burner chamber, a fuel consuming burner in each said burner chamber, a super-structure including walls and top overlying said reflectors and mounted in operative association therewith and in cooperation with said upper shelves forming gas collecting means, a hollow heating element in each said heating chamber communicating between its respective burner chamber and said collecting means and adapted to carry products of combustion from said burner to said collecting means and to be heated thereby.

10. A space heater comprising rough-in box elements adapted for installation in a building wall, concave reflectors secured to and disposed in back to back relationship within said box elements forming the vertical confining and reflecting elements of heating spaces, an upper shelf at the top of each reflector forming the top of each heating space, a lower shelf near the bottom of each reflector forming the bottom of each heating space, each of said lower shelves and a subjacent section of the respective reflectors forming a burner chamber, a fuel consuming burner in each of said burner chambers, a superstructure including gas collecting means overlying both reflectors and mounted at the upper portion of said box elements, a single flue pipe carried by said superstructure for discharging products of combustion, a hollow heating element in each of said heating spaces adapted to carry upward products of combustion from its respective burner and to be heated thereby, said superstructure including communicating means operatively associated with said gas collecting means for conveying products of combustion from said heating elements to said flue pipe.

11. A space heater comprising vertically elongated rough-in box elements adapted for installation in a building wall, a pair of substantially semi-cylindrical reflectors in spaced back to back relation and within the walls of the rough-in box elements defining by their back surfaces with the box elements a common inner space within the box elements and by their front surfaces oppositely reflective heating spaces, heating means each comprising tubes extending vertically throughout the length of each said reflective heating space, upper and lower horizontal partitions in said reflectors having apertures for reception of said tube means, each said lower partition being also the upper wall of a separate burner chamber, burner devices in said burner chambers, a vertical separating wall between said burner chambers extending downward to approximately floor level, means forming separate flue chambers above each reflective heating space and separated therefrom by said upper partition, said flue chambers being relatively open at front sides of each, and a common vent in communication with both said flue chambers.

12. A space heater comprising vertically elongated rough-in box elements adapted for installation in a building wall at a location above a floor, a pair of semi-cylindrical sheets in spaced back to back relation at a location above the floor and retained by and within the walls of the rough-in box elements defining by their back sides with the rough-in box elements a common inner space and by their front sides oppositely directed concave reflective heating spaces, heating means comprising vertical tubes extending throughout each said heating space, upper and lower plates closing off the top and bottom respectively of each heating space and having apertures receiving said tube means, each said lower plate being also the upper wall of a separate burner chamber, burners supported in said burner chambers, a vertical separating wall between said burner chambers extending downward to approximately floor level, means forming flue chambers above each said heating space and separated therefrom by said upper plate, said flue chambers being substantially open at front sides of each, and a common vent in communication with both said flue chambers.

WILLIAM G. CARTTER.

REFERENCES CITED

The following references are of record in the file of this patent:

UNITED STATES PATENTS

| Number | Name | Date |
|---|---|---|
| 1,066,394 | Fischer | July 1, 1913 |
| 1,216,848 | Schmidt | Feb. 20, 1917 |
| 1,660,690 | Terry | Feb. 28, 1928 |
| 1,891,047 | Gwaltney | Dec. 13, 1932 |
| 1,947,830 | Cuyler et al. | Feb. 20, 1934 |
| 1,975,921 | Bridge | Oct. 9, 1934 |
| 2,139,250 | Zingone | Dec. 6, 1938 |
| 2,163,928 | Andrews | June 27, 1939 |
| 2,190,349 | Beam | Feb. 13, 1940 |